Figure 16:
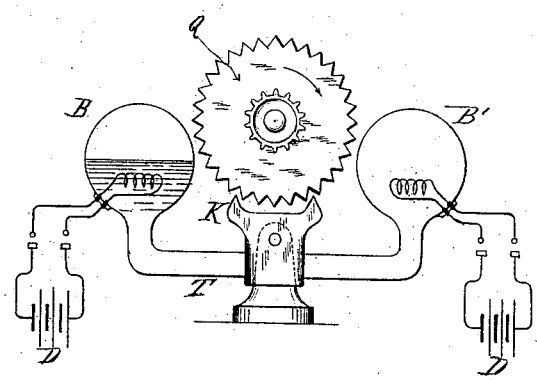

(No Model.) 5 Sheets—Sheet 1.
E. THOMSON.
ELECTRO MECHANICAL DEVICE.
No. 381,442. Patented Apr. 17, 1888.
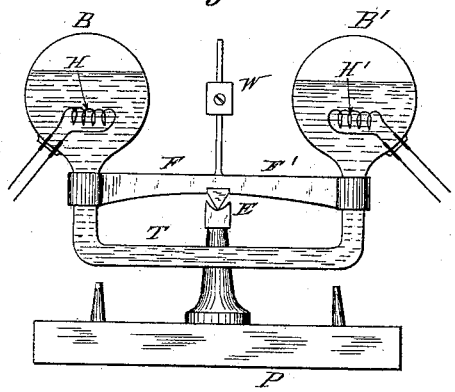
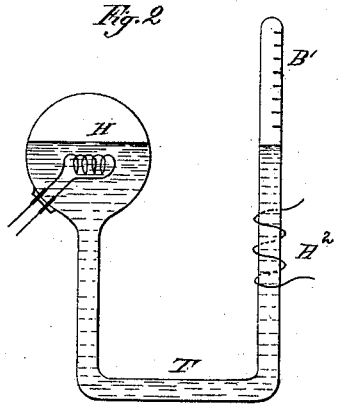
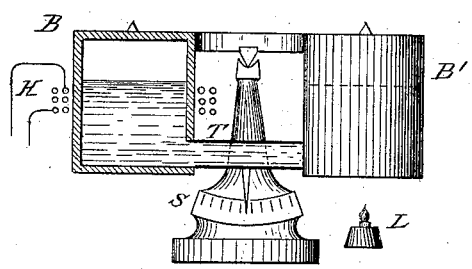
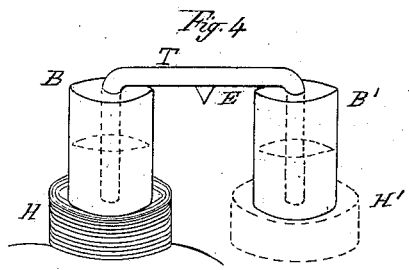
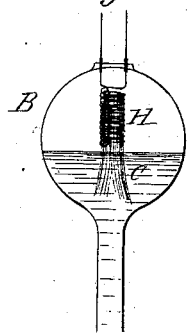
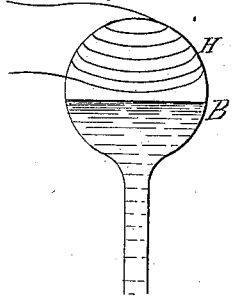
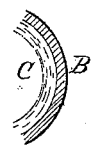
WITNESSES:
Raphael Netter.
Wm H Capel.
INVENTOR,
Elihu Thomson.
BY
Townsend E. MacArthur,
ATTORNEY.

(No Model.) 5 Sheets—Sheet 2.
E. THOMSON.
ELECTRO MECHANICAL DEVICE.
No. 381,442. Patented Apr. 17, 1888.
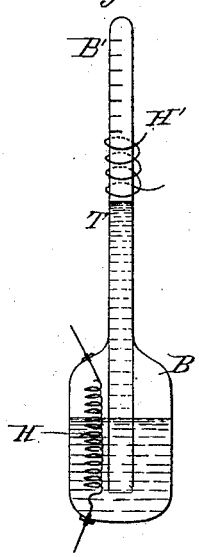
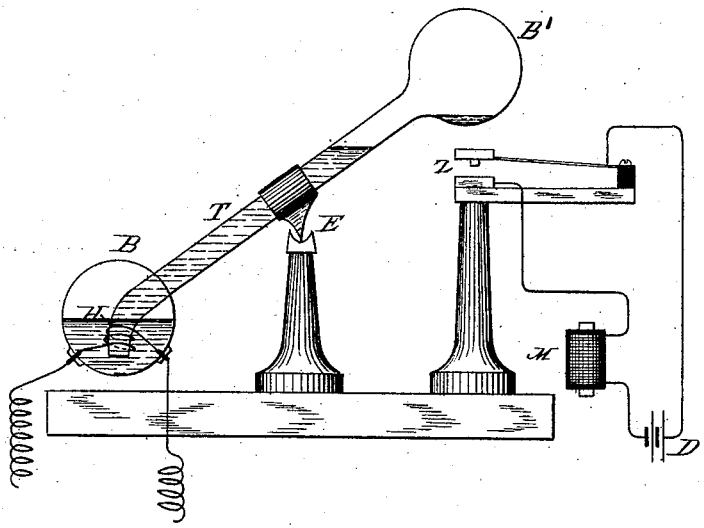
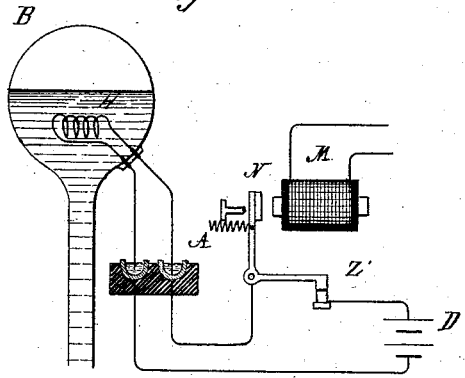
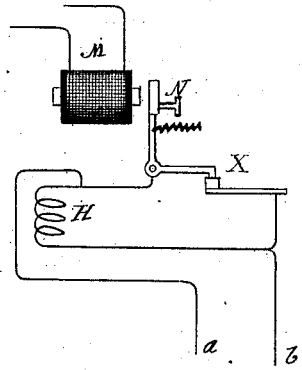
WITNESSES:
Raphaël Netter.
M. H. Capel.
INVENTOR.
Elihu Thomson
BY
Townsend & MacArthur,
ATTORNEY.
N. PETERS. Photo-Lithographer, Washington, D. C.

(No Model.)
E. THOMSON.
ELECTRO MECHANICAL DEVICE.
No. 381,442. Patented Apr. 17, 1888.
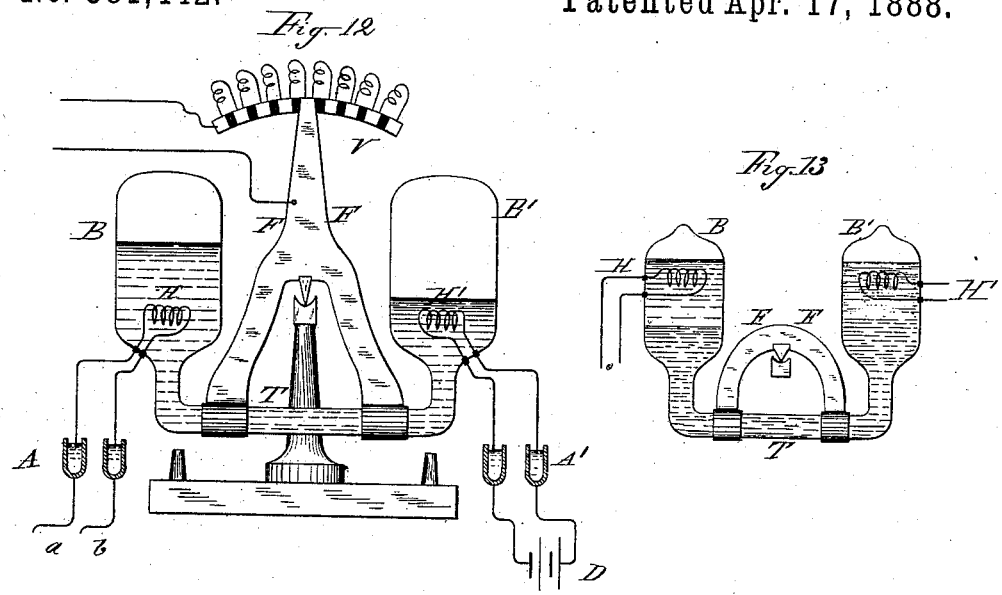
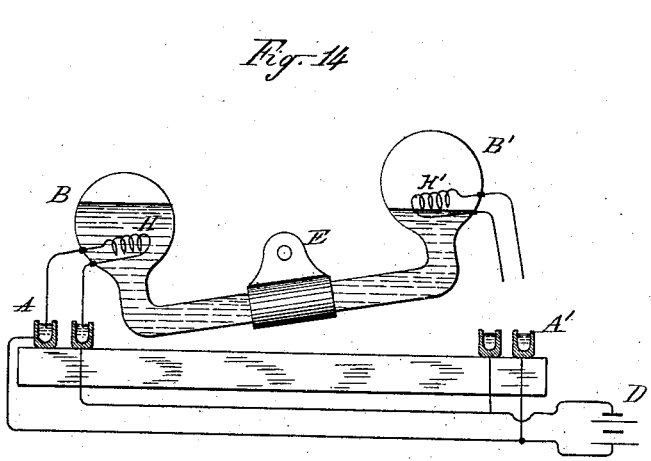
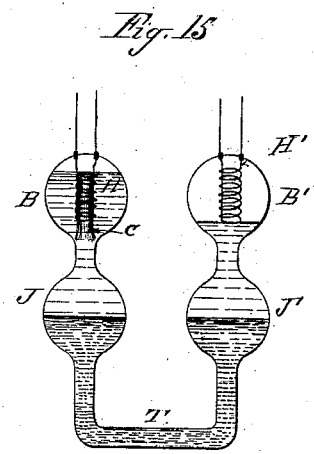
WITNESSES:
Raphaël Netter
Wm H Capel
INVENTOR.
Elihu Thomson
BY
Townsend and MacArthur
ATTORNEY.

(No Model.) 5 Sheets—Sheet 4.

E. THOMSON.
ELECTRO MECHANICAL DEVICE.

No. 381,442. Patented Apr. 17, 1888.

WITNESSES:
Raphael Netter
Wm H Capel

INVENTOR.
Elihu Thomson
BY
Townsend & MacArthur
ATTORNEY.

(No Model.)  5 Sheets—Sheet 5.

E. THOMSON.
ELECTRO MECHANICAL DEVICE.

No. 381,442.  Patented Apr. 17, 1888.

WITNESSES:
Raphaël Netter.

INVENTOR.
Elihu Thomson.

BY
Townsend & MacArthur
ATTORNEY.

UNITED STATES PATENT OFFICE.

ELIHU THOMSON, OF LYNN, MASSACHUSETTS.

ELECTRO-MECHANICAL DEVICE.

SPECIFICATION forming part of Letters Patent No. 381,442, dated April 17, 1888.

Application filed November 3, 1887. Serial No. 254,222. (No model.)

*To all whom it may concern:*

Be it known that I, ELIHU THOMSON, a citizen of the United States, and a resident of Lynn, in the county of Essex and State of Massachusetts, have invented certain new and useful Electro-Mechanical Movements, of which the following is a specification.

My invention relates to novel devices for utilizing the heating effects of a current of electricity upon a body of volatile fluid, as set forth more generally in a prior application for patent filed by me October 19, 1887, Serial No. 252,793.

My present invention relates more particularly to a form of apparatus wherein the evaporation of the liquid gives rise to a vapor, which is held in a confined space and the tension of which acts to impart a movement to some device, preferably to the body of liquid from which the vapor is evolved. The movement of the liquid itself may be the ultimate movement desired, or may give rise to other movements, which may be utilized, as hereinafter described.

My invention consists in the combinations of apparatus hereinafter set forth, whereby an electric current may be measured, or whereby a continued oscillatory or reciprocating movement may be set up and continued through the movements produced by the action of the confined vapor evolved from the liquid.

The particular combinations forming my invention will be more particularly specified in the claims. Some of the combinations are applicable to cases where the bodily movement of the liquid contained in the pivoted receptacle is produced by pressure upon the column of liquid set up in other ways than by the evolution of a vapor from the liquid itself.

Figure 17:
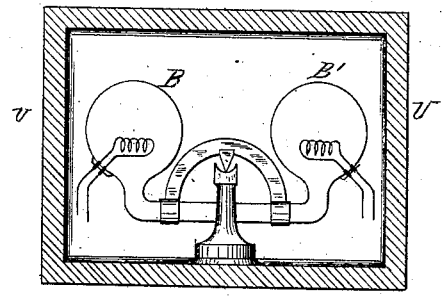
Figure 18:
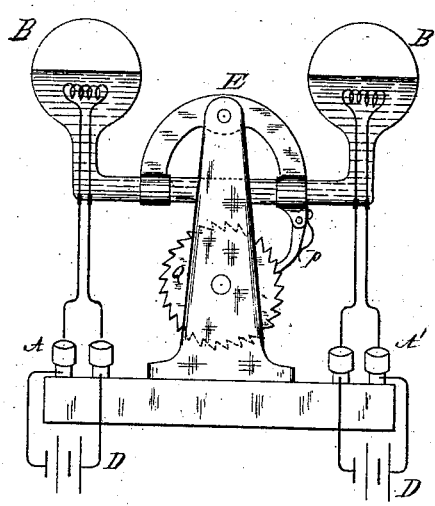
Figure 19:
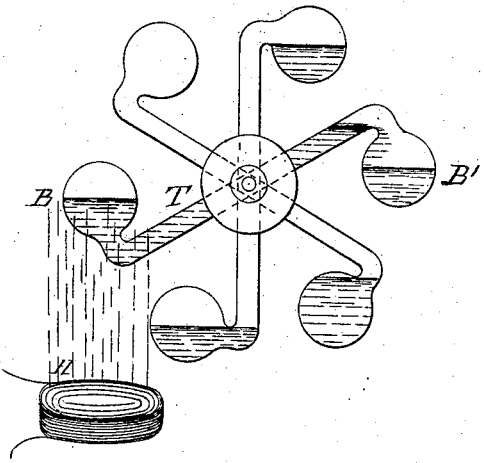
Figure 20:
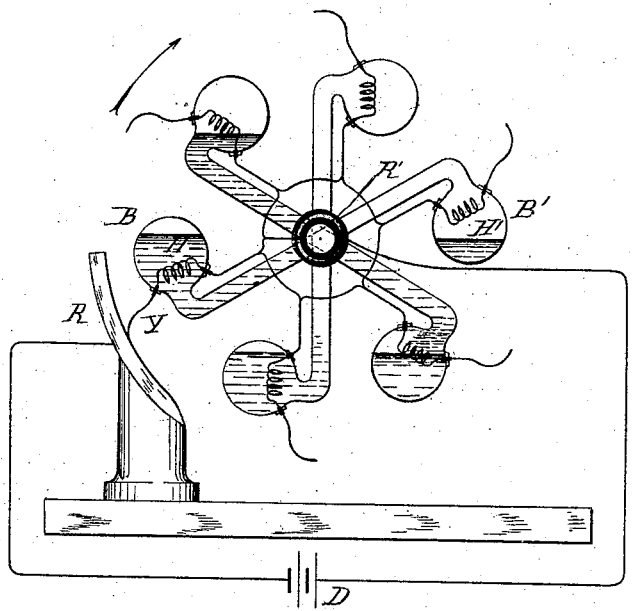
Figure 21:
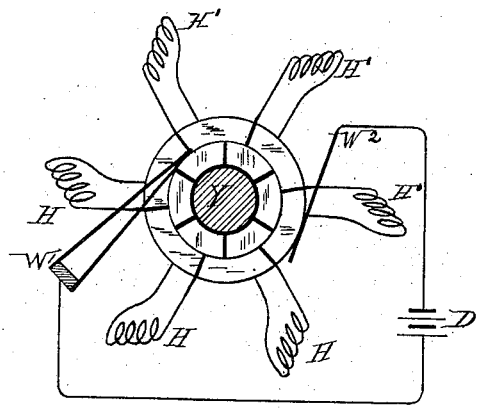

In the accompanying drawings, Figure 1 is an elevation of an apparatus in which my invention is embodied for the purpose of indicating indirectly the strength of the current. Fig. 2 is an elevation of an apparatus in which the movement of the liquid indicates directly the strength of the current. Fig. 3 illustrates a modification of Fig. 1, with the heating coil on the outside of the coil or receptacle. Fig. 4 illustrates another modification of the same construction with the heating-coil arranged below the bulb. Figs. 5, 6, and 7 are detail views of further modifications in the construction of the bulb and arrangement of the heating-coil. Fig. 8 illustrates another form in which the invention may be embodied for the purpose of indicating directly the strength of the current. Fig. 9 illustrates a form of the invention wherein the movement of the volatile liquid results in a further movement of an electric switch to open or close an electric circuit. Fig. 10 is a view of an apparatus in which the passage of the heating-current is controlled by an electro-magnet on an independent circuit. Fig. 11 is a modification of the same device. Fig. 12 is a view of an apparatus in which the movement of the volatile fluid is followed by a mechanical movement resulting in operating a rheostat to introduce more or less resistance into an electric circuit. Fig. 13 illustrates a modification of my invention in which I employ liquids of different specific gravity, for a purpose which will hereinafter be explained. Fig. 14 shows a form of apparatus in which the movement of the volatile liquid gives rise to an intermittent oscillatory motion. Fig. 15 is a modification of the construction shown in Fig. 13. Fig. 16 shows an apparatus in which an intermittent oscillatory motion causes the release of an escapement-wheel. Fig. 17 illustrates an inclosing box or case designed to protect the apparatus from the variations in the outside temperature. Fig. 18 shows the intermittent oscillatory motion as giving rise, by means of a pawl and ratchet-wheel, to an intermittent rotary movement. Fig. 19 illustrates a number of closed receptacles grouped upon an axis in such manner as to give rise to a continuous rotary motion. Figs. 20 and 21 are further exemplifications of the principle illustrated in Fig. 19.

In Fig. 1, B B' are two receptacles or chambers or bulbs connected by a tube or passage. These receptacles are made of glass or other suitable material. In one or both of these bulbs is placed a coil or resistance, H, capable of being traversed by an electric current and connected with wires which are hermetically sealed into the sides of the bulbs or receptacles. The bulbs or receptacles are partly filled, as well as the tube T, with a vaporizable liquid—such as ether or alcohol—and are sealed or otherwise securely closed against the loss of liquid by evaporation. The bulbs may be sealed with an atmosphere of air or other gas above the liquid; but I prefer, for extra sensitiveness, to so construct the apparatus that it shall contain only the vapor of the liquid itself. Thus, if ether or alcohol be used, the space above the liquid would be filled with a tenuous vapor of ether or alcohol. If, now, either of the resistance coils H H' be traversed by an electric current a gradual expulsion of the fluid from the bulb in which the coil receiving the electric current exists will take place and an accumulation of liquid in the other bulb.

The apparatus, Fig. 1, is supported in a frame, F F', bearing, by a knife-edge or other pivoted support at E, on a pillar extending from a base-plate, P. An adjustable counterweight, W, is sometimes added to enable an adjustment of the center of gravity to be made in accordance with the requirements. By raising the weight W the center of gravity of the whole movable portion is raised, so that it may be above or below the suspension-point E, and the apparatus be placed in unstable, indifferent, or stable equilibrium, as the case may be. The application of current alternately to the coils H and H' of the apparatus shown in Fig. 1 will alternately overbalance the apparatus and cause oscillation of the moving parts by the movement of the fluid from side to side, in accordance with the operation as above described. I will point out farther on how this oscillatory movement may be utilized.

In Fig. 2 the bulb B, provided with its heating-resistance H, which resistance is preferably placed inside the bulb, communicates by a tube, T, with an upright indicating tube or extension, B', in which tube or extension B' the level of the liquid may be read, as desired. The passage of a current in the coil H will, by the heat evolved, evaporate the fluid in H, so as to cause the liquid to ascend in the tube B' to a height depending upon the energy or vigor of the electric discharge passing through the coil H. In order to diminish the sensitiveness of the apparatus, there may be added another coil, $H^2$, wound around the tube B', as shown, and traversed by a constant electric current, or a current whose amount may be controlled by any suitable means. This coil $H^2$ acts to increase the vapor-tension in the bulb B', and thereby to oppose the action produced by the current passing in the coil H. The coil $H^2$ is adapted to raise the temperature of the liquid in B' but slightly. It could be arranged as the coil H is arranged—in the interior of the receptacle, with its wires sealed in the sides thereof; but the construction shown is the preferable one.

In Fig. 3 I have shown the closed receptacles in the form of metal boxes B B', one of them, B, being in section, and around its outside a heating-coil is so placed as to be traversed by an electric current. A similar coil can surround B', if necessary. Alcohol or ether is made to partially fill the apparatus, and the empty space is preferably pumped out by a vacuum-pump or otherwise exhausted, and the vessel then sealed up closely. The tube T, as before, connects the lower parts of each receptacle B B'. The two receptacles, with the connecting-tube, are supported by knife-edges, as shown, and an indicating-coil carried by the tube T passes over a scale, S, showing the disturbance of equilibrium which may be produced by inequalities of temperature in the receptacles B B' as the result of the passage of an electric current in the coil H. It may sometimes be desirable to oppose the heating action of the coil H by the application of heat to the receptacle B'. As a type of such an arrangement I have shown a small lamp, L, whose flame is placed below the receptacle B', and which acts, as did the coil $H^2$ in Fig. 2, to increase the vapor-tension above the liquid in the receptacle B' and render less easy the transfer of liquid from the receptacle B to the receptacle B' under the action of the coil H. The more vigorous the current passing in coil H the greater will be the movement of the parts from the position of equilibrium on the support or knife-edge E, and the indicating-needle will point out this change of position on the scale S.

In Fig. 4 the receptacles B B' may be of glass or metal, with the tube T passing down to the interior from above and opening near the bottom of each vessel. As before, the vessels B B' are partly filled with vaporizable liquid. The coil H is shown in this case as placed below the receptacle B and not movable with it, but communicating its heat by convection or radiation to the receptacle B. An opposing or counteracting coil, H', might be placed, as shown in dotted lines, under the receptacle B', for a purpose similar to that of H' in Fig. 1 and $H^2$ in Fig. 2.

Either of the bulbs or receptacles B B' may be variously modified. Thus, as in Fig. 5, instead of the coil H, Fig. 1, being immersed in the liquid of the receptacle B, it may simply be wound upon a piece of cotton wicking extending into the liquid, the coil being located above the surface of the liquid. The wicking in this case by its capillary action will bring sufficient fluid from the lower level up to the coil H to be evaporated by any current that happens to be passing in the coil H, and thus generating an increased vapor-tension in the upper portion of the bulb. It is proper to say here that in all the cases in which the coil H is placed within the bulb it may be attached to platinum wires sealed in the glass of such bulb or receptacle when it is made, and the coils of the resistance H may be composed of a strip or coil of metal—such as German silver—or may be made of carbonized thread or filament carried by the platinum wires; or it may be constructed of other metal in any way giving a definite and determinate electrical resistance between the wires.

In Fig. 6 the heating-coil H is shown as constituting a sort of spiral around the upper portion of the bulbs or receptacles, and the heat is applied to the exterior and is conducted inward. In such a case it is best to line the bulb or receptacle B with a cotton or fibrous lining, C, as indicated in Fig. 7, whereby the whole interior or a large portion of the interior of the bulb B is kept moist with the vaporizable fluid or liquid to facilitate its evaporation under the heating action.

In Fig. 8 the apparatus is modified, and consists of a bulb or receptacle, B, from the bottom of which rises a vertical tube, T, the upper part of which, B', may be graduated. The heating-coil H is immersed wholly or in part in the liquid in the bulb B, increases the vapor-tension thereof, and causes an elevation of the liquid in the tube T to a height depending upon the energy of the heating effect of the current which may at any time be passing in the coil H. A counteracting heating-coil, H', may be applied externally, as in Fig. 2, or internally, to the tube T, if needed, to oppose the action of the heat in the coil H in raising the fluid. The device may thus be used as an indicator of current strength in H, such current being either alternating, intermittent, pulsating, or continuous, and the reading obtained will be the average effect of a current, which may fluctuate through considerable periods of time.

In Fig. 9 I have shown the apparatus modified in such a way that by the heat generated in the heating-coil H by the passage of an electric current the liquid contained in the bulb B is driven upward through the tube T and into the upper bulb, B'. The receptacles, with the connecting tube or passage, are pivoted or suspended on knife-edges, as indicated at E, so that when sufficient liquid has passed from the bulb B into the bulb B' the latter overbalances the former and descends. As the ascent of the liquid into receptacle B' is made against the pressure of the column of liquid in T, the apparatus only responds to a certain strength of current in the wire. The bulb B' in its descent may strike an electric switch at Z, either closing or opening (closing in the figure) the same, and controlling the passage of a current through an electro-magnet, M, or other electrical apparatus, such current being obtained from any suitable source, such as a battery, D. In this way a current passing in the coil H may be made to act as a means for controlling the actions of the current obtained from the source D in causing electro-magnetic attractions, or otherwise.

In Fig. 10 the reverse of this action is shown. In this case a current passing in the magnet M attracts its armature N, thereby closing a contact at Z', whereby the resistance or heating coil H of the bulb B is brought into circuit with a battery or source of current, D, suitable contacts to the circuit-wires being made through mercury-cups—for instance, as at A. The closing of the contact Z' is followed by the production of heat in the coil H, and this in turn by evaporation and a movement of the fluid in the bulb B, which is supposably connected with its accompanying bulb, B', as in Fig. 1. The motion of the fluid so produced may be utilized in various ways to actuate other devices, or become the means for indicating the amount of current strength in the circuit from the source of current, D.

In Fig. 11 the magnet M, when traversed by a current, attracts its armature N, thus opening a contact, X, which contact is a shunt of low resistance around the heating-coil H. Substantially the effect is the same as in Fig. 10, and in this Fig. 11 the wires $a$ $b$ are leading-wires from the source of current.

It is sometimes useful to employ my invention to adjust the resistance in an electric circuit, or, in other words, to operate a variable rheostat, as at V, Fig. 12. The arrangement of the receptacles B B' is the same as in Fig. 1, each being shown provided with a heating-coil in its interior, though this coil or resistance might, of course, be exterior to the receptacles, as in Figs. 3 and 4, already described. I have shown the coil H' as kept in circuit by a contact with a source of current, D, which current may be of constant strength, and the effect of which would, if alone acting, be to force the fluid from the receptable B' into the receptacle B and cause the descent of the receptacle B and a movement of the varying contact-arm to the left. Now let a current of a determinate strength be passed through the coil H. This current may become sufficient to increase the vapor-tension in the receptacle B to such an extent as to force back the liquid in the receptacle B over into B' and cause a movement of the receptacle B' downward by the increased weight of the fluid obtained and a movement of the contact-arm of the rheostat V to the right. If the center of gravity of the whole apparatus be made to exist at some little distance below the point of suspension or support, the movement accomplished by the apparatus will be a gradual one, following the changes in the amounts of liquid in one side and the other; but if the center of gravity of the apparatus is above the point of support, such movement will not take place except by a sudden jump—that is, the balance will be overset and be in unstable equilibrium, and there will be no motion of the apparatus until a certain amount of fluid has passed from one side to the other, when the device will then be moved quickly to its extreme limit on the other side. It may be desired to obtain these varying effects in certain specific cases. The variable resistance V may also be used either as a shunt around a portion of an electric circuit, as a variable resistance introduced into and cut out of a circuit, or in other ways, the relation of the resistance to the circuit being controlled by a motion to the right or to the left of the switch arm, in accordance with the increased weight of the load in either receptacle B B'.

My apparatus provides an efficient means for the operation of a variable rheostat in any desired way, and since the receptacles B B' may be made of large capacity, so as to hold a considerable weight of liquid, and may be set at any desired distance from the center of suspension, or in any desired relation to the center of suspension, a force amply sufficient to do considerable work and overcome considerable friction may be obtained, even though the current strength available is quite moderate. The element of time comes in to enhance the effects of the current by an accumulative action occurring.

In Fig. 13 I have shown how my apparatus may be made more compact and more powerful. In this case the receptacles B B', with the heating coils or resistances H H' suitably applied, are filled in part with a light fluid—such as alcohol, water, or ether—above a denser fluid—such as mercury—below. (Indicated by the dark shading in the figure.) The passage of current in either coil H H' evaporates the light liquid above and forces the heavier liquid below—such as mercury—downward and up into the other bulb or receptacle, thus producing in smaller volume a much greater difference in weight with respect to the position of the fulcrum or point of suspension, so that more energetic effects are obtained with a diminutive apparatus than can be obtained when alcohol, water, or other volatile fluid is used alone.

In Fig. 14 I have shown the apparatus of Fig. 1, with the addition of circuit-changing devices—such as a pair of mercury-cups—at A and A', whereby the current of electricity from any source—such as a battery at D—may be alternately caused to traverse one or the other of the coils H H' by the dipping of the wires which form the terminals of either coil H H' into their respective mercury-cups, located in pairs at A A'. In the position shown in the figure the coil H, being in circuit with the source of current, D, is heated, and the energy will be expended in causing a transfer of liquid from the receptacle B to the receptacle B'. When this has occurred to a sufficient extent, the superior weight of B' so brought about will cause it to descend, dipping the terminals of the coil H' and causing a renewed expulsion of the liquid back into the receptacle B, and the actions as thus described will be indefinitely repeated so long as the source of current lasts. Thus a continual rocking-action will ensue, which can be utilized in various ways, and my invention in this form constitutes a useful motor apparatus depending for its operation on electric currents. I am able to apply it also in a modified form to metering purposes.

In Fig. 15 I have shown a modification of the apparatus of Fig. 13, wherein the lighter and heavier fluids are contained in different bulbs or receptacles, the upper bulbs, B B', containing the volatile liquid or fluid and communicating with a second set of receptacles, J J', below, which contain the heavier fluid—such as mercury—before mentioned. This arrangement is somewhat better than that shown in Fig. 13 in this respect, that less of the heat imparted to the vaporizable liquid is diffused into the mercury or heavier liquid, which tends to heat the same and detract from the activity of the actions displayed.

In Fig. 16 I have shown how the apparatus of Fig. 1 or of Fig. 14 may be utilized to operate the escapement K for an escapement-wheel, Q. The oscillation back and forth, as described in connection with Fig. 14, may be made by an escapement, K, to allow tooth after tooth of the wheel Q to pass. The apparatus here shown will be useful as a controlling device for feeding mechanism—as in electric-arc lamps—and may be operated by either direct or alternating currents, since the length of the arc may be made to control, in accordance with the principles of Fig. 10, the activity of the device, the magnet M of Fig. 10 being assumed to be in a derived circuit around the arc or otherwise suitably placed to respond to variations in current, which could be followed by a feed of the carbons.

In order to avoid the disturbing effects of variations of outside temperature upon the bulbs or receptacles B B', it is generally preferable to inclose the apparatus in a non-conducting box or case, so as to shield the bulbs or receptacles from the air. It is not necessary, however, that the casing be a non-conductor for heat, as it may be made of heavy copper or other metal, as this will insure a uniform temperature in the interior. A convenient form of case or box is represented in Fig. 17 at U U, and if made of metal it may have a non-conducting lining, if desired—such as a layer of wood or felt—in its interior. It may also be a wooden box lined with copper in its interior, or more simply a plain wooden case or metal box.

Fig. 18 shows the application of my invention as displayed in Fig. 14 to move a pawl and ratchet-wheel, or to give a step-by-step movement. In this case the alternate transfer of liquid from the bulb B to the bulb B' and back again, ensuing upon the dipping or circuiting of the terminals of the respective heating-coils, causes a movement to be imparted to the pawl, thus giving movement to a ratchet-wheel, Q, suitably arranged and pivoted, whereby at each shift of position one tooth or more is fed or pushed forward, and an intermittent rotary movement is given to the wheel Q. It is desirable in the case of the organization of Fig. 18 to so adjust the center of gravity of the oscillatory portion of the apparatus that it shall be above the point of support, E, in unstable equilibrium, as in this way the actions are more positive, the movement from side to side being a quick one, occurring after pauses of more or less length of time. Thus a rotary motion may be given to the wheel Q, and the number of oscillations occurring may be registered.

In Fig. 19 the apparatus is so modified as to cause a rotary motion to be produced by the heating action of the coil H when traversed by a current. Heat is transferred from the coil by radiation and convection, to a series of containing-receptacles, each one of which consists of an independent receptacle consisting of two bulbs or chambers, B B′, connected by a tube, T, and having no connection with any of the other sets of receptacles and tubes. Three or more of such double receptacles joined by tubes, combined in the form shown in Fig. 19, may be mounted upon a central shaft or axis suitably supported, each receptacle having been previously partially filled with a vaporizable or expansible fluid, and preferably exhausted or boiled to exclude atmospheric air and then sealed. In the apparatus so constructed a continuous rotative effort is exerted, by virtue of the fact that whenever a bulb or receptacle comes near or over the heating-coil the fluid in it, acquiring greater vapor-tension, is forced into the corresponding receptacle or bulb at the other end of the diameter, thereby increasing the weight on that side of the axis and resulting in a gradual descent of the heavy side, which has received the liquid, and an ascent on the lighter side, from which the liquid has been expelled. There results from this a continuous rotary motion, which may become more or less rapid, according to the energy of the heating-coil H and the proportions of the apparatus in relation thereto.

While in Fig. 19 the heating-coil is shown as exterior to the bulb, by a simple modification (indicated in Fig. 20) each bulb, as B B′, may have its own heating-coil in its interior or wound about the exterior. In this case it will be necessary to provide for putting the heating-coils into circuit successively, and in such a way that they shall be traversed by a current whenever the bulbs or receptacles are at or near the position occupied by the bulb B, Fig. 20, and that the said heating-coils shall at other positions be out of circuit, or at least not traversed by much or any current. To secure this result it is only necessary that one of the terminals of each of the heating-coils Y of the coil H shall touch a contact-surface, as R, suitably placed with respect to the rotation and connected with one terminal of the heating-current, and that the other terminals of the heating-coils shall unite in a common joint, as R′, which joint is in connection with the other terminal of the heating-current. These connections are indicated in Fig. 20, and will result, when a current flows from the source D, in each of the heating-coils receiving current at that position during the rotation, where the heat developed may cause expulsion of fluid from the bulb, as B, over into the bulb B′, thus giving rise to the conditions as described in connection with Fig. 19, whereby a rotary motion is obtained.

My invention in the form shown in Figs. 18, 19, and 20 is applicable to the keeping of clock-work in motion by the action of quite feeble currents, and the action may become continuous, as will be evident. By adjusting the strength of the current—as by the interposition of a resistance in the circuit, &c., or in any other way—the speed of motion may be controlled—that is, increased or diminished.

In Fig. 21 is shown a simplified arrangement, whereby, by a suitable commutator, the heating-coils H H H H′ H′ H′ may be brought into circuit in succession. The commutator Y consists of a number of insulated segments equal to the number of heating-coils, each segment being connected to a terminal of a coil in regular order, the other terminals of the coils not so connected being attached to a metallic ring. Brushes W′ W² bear upon both the ring and the segments and are connected with the source of current, D. The brushes W′ are placed in contact with the segments when the heating-coils are to receive current and at the proper position to cause rotation. The brush W² may be placed in any convenient position upon the ring upon which it bears, the ring being connected to one terminal of each heating-coil.

What I claim as my invention is—

1. The combination of a closed receptacle partly filled with volatile liquid, a heating-conductor giving rise to a bodily movement of said liquid, and a register for indicating the amount of said movement.

2. The combination of a closed receptacle partly filled with a volatile liquid, and a coil or other resisting part of an electric circuit in heating proximity to a wick or other porous substance extending into said liquid.

3. The combination of a closed receptacle partly filled with volatile liquid, a heating-conductor giving rise to a bodily movement of such liquid, and a switch-magnet in an independent circuit for controlling the passage of the heating-current.

4. The combination of a closed receptacle partly filled with volatile liquid, and a heating-conductor within such receptacle and in heating proximity to a wick or equivalent porous substance extending into said liquid.

5. The combination of a closed receptacle consisting of two communicating chambers or bulbs partly filled with a volatile liquid, a heating-conductor applied to one chamber or bulb, and a source of heat applied to the other chamber or bulb.

6. The combination of a closed receptacle consisting of two closed communicating chambers or bulbs partly filled with a volatile liquid and differentially-heated conductors applied to said chambers or bulbs.

7. The combination of a closed receptacle consisting of two closed chambers or bulbs communicating below and differentially-heated conductors applied to said chambers to produce a retarded movement of said liquid from one receptacle to the other.

8. The combination of a pivoted receptacle consisting of two closed chambers or bulbs communicating below, a heating-conductor applied to one chamber or bulb and giving rise to a bodily movement of said liquid, and a register for indicating the movement of said pivoted receptacle.

9. An oscillating structure consisting of two closed chambers or bulbs communicating below and partly filled with volatile liquid, and heating-conductors applied to said chambers or bulbs and adapted to force said liquid from one chamber to the other.

10. An oscillating structure consisting of two closed chambers or bulbs communicating below, mounted on a pivot and partly filled with volatile liquid, and heating-conductors applied to said chambers or bulbs and adapted to drive the liquid from one bulb to the other, and switch devices for alternately connecting said conductors with the heating-current.

11. An oscillating structure consisting of two closed chambers or bulbs communicating below, mounted on a pivot and partly filled with volatile liquid, heating-conductors applied to said chambers or bulbs, and automatic switch devices mounted on said chambers or bulbs for connecting said heating-conductors successively with the heating-circuit.

12. A pivoted receptacle consisting of two closed chambers or bulbs communicating below and partly filled with volatile liquid, heating-conductors giving rise to an oscillatory motion of said receptacle, and a register for indicating the movement of said receptacle.

13. A pivoted receptacle consisting of two closed chambers or bulbs communicating below, heating-conductors giving rise to an oscillation of said receptacle, and means for controlling an independent electric circuit actuated by the movement of said receptacle.

14. A group of pivoted receptacles, each consisting of two closed chambers or bulbs communicating below and partly filled with volatile liquid, a revolving pivot or axis, and a heating-conductor acting successively on the bulbs or chambers on one side of said pivot or axis.

15. A group of pivoted receptacles, each consisting of two closed chambers or bulbs communicating below and partly filled with volatile liquid, a revolving pivot or axis, heating-coils, and switch devices for successively connecting said coils into circuit on one side of said pivot.

16. A group of pivoted receptacles, each consisting of two closed chambers or bulbs communicating below and partly filled with volatile liquid, a revolving pivot or axis, heating-conductors giving rise to a rotary motion of said pivot or axis, and a register for indicating the amount of movement of said pivot or axis.

17. The combination of a closed receptacle partly filled with volatile liquid, a heating-conductor applied to said receptacle, and an inclosing case or box which is a non conductor of heat.

18. The combination of a pivoted receptacle consisting of two closed chambers or bulbs communicating below, and partly filled with a layer of comparatively heavy liquid below and a layer of comparatively light and volatile liquid above, and heating-conductors in heating proximity to said layers of volatile liquid, substantially as specified.

19. A pivoted receptacle in unstable equilibrium, consisting of two closed chambers or bulbs communicating below and partly filled with volatile liquid, heating-conductors applied to said chambers or bulbs giving rise to oscillatory movements of said receptacle at definite periods, and a register for indicating the movement of said receptacle.

Signed at Lynn, in the county of Essex and State of Massachusetts, this 26th day of October, A. D. 1887.

ELIHU THOMSON.

Witnesses:
E. WILBUR RICE, Jr.,
J. W. GIBBONEY.